United States Patent
Onoda et al.

(10) Patent No.: US 10,437,104 B2
(45) Date of Patent: Oct. 8, 2019

(54) ILLUMINATION DEVICE AND DISPLAY DEVICE

(71) Applicant: Japan Display Inc., Minato-ku (JP)

(72) Inventors: Ken Onoda, Tokyo (JP); Shinichi Komura, Tokyo (JP); Youichi Asakawa, Tokyo (JP); Toshihiko Fukuma, Tokyo (JP)

(73) Assignee: Japan Display Inc., Minato-ku (JP)

( * ) Notice: Subject to any disclaimer, the term of this patent is extended or adjusted under 35 U.S.C. 154(b) by 51 days.

(21) Appl. No.: 15/730,076

(22) Filed: Oct. 11, 2017

(65) Prior Publication Data
US 2018/0107029 A1   Apr. 19, 2018

(30) Foreign Application Priority Data
Oct. 13, 2016   (JP) .................... 2016-201792

(51) Int. Cl.
| G02F 1/1335 | (2006.01) |
| F21V 8/00 | (2006.01) |
| G02F 1/01 | (2006.01) |

(52) U.S. Cl.
CPC ....... G02F 1/133615 (2013.01); G02B 6/003 (2013.01); G02B 6/0036 (2013.01);
(Continued)

(58) Field of Classification Search
CPC ............ G02F 1/0105; G02F 1/133615; G02F 1/133528; G02F 1/133514; G02F 1/133526; G02F 2001/133607; G02F 1/1336; G02F 2001/133616; G02F 1/133606; G02F 1/133504; G02F 1/133605; G02F 2001/133626; G02B 6/003; G02B 6/0036; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/0031; G02B 6/0088
(Continued)

(56) References Cited

U.S. PATENT DOCUMENTS

| 4,874,228 A * | 10/1989 | Aho ..................... F21V 7/00 349/62 |
| 5,054,885 A * | 10/1991 | Melby ................. F21V 7/00 359/618 |

(Continued)

FOREIGN PATENT DOCUMENTS

JP   2014-67531   4/2014

*Primary Examiner* — Shan Liu
(74) *Attorney, Agent, or Firm* — Oblon, McClelland, Maier & Neustadt, L.L.P.

(57) ABSTRACT

According to one embodiment, an illumination device includes a first member, a second member, a first light source. The first member includes a first prism array including first prisms aligned in a first direction. The second member includes a second prism array including second prisms aligned in a second direction. The second member disposed more closely to a first A side than to the first member. The first light source disposed more closely to a second A side than to the second member to apply a parallel light beam to a second B side. The parallel light beam from the first light source is made incident on the second prism array and incident on the first prism array without passing through a light guide.

8 Claims, 7 Drawing Sheets

(52) U.S. Cl.
CPC ...... *G02F 1/0105* (2013.01); *G02F 1/133514* (2013.01); *G02F 1/133526* (2013.01); *G02F 1/133528* (2013.01); *G02F 2001/133607* (2013.01)

(58) Field of Classification Search
USPC ..................................................... 349/61–67
See application file for complete search history.

(56) References Cited

U.S. PATENT DOCUMENTS

| | | | | |
|---|---|---|---|---|
| 6,561,661 | B2* | 5/2003 | Egawa | G01D 11/28 362/23.1 |
| 2006/0215388 | A1* | 9/2006 | Hamada | G02B 6/0068 362/23.18 |
| 2007/0047262 | A1* | 3/2007 | Schardt | G02B 6/0055 362/623 |
| 2009/0040787 | A1* | 2/2009 | Nagata | G02B 6/0028 362/619 |
| 2010/0195022 | A1* | 8/2010 | Shikii | G02B 6/0016 349/65 |
| 2010/0289986 | A1* | 11/2010 | Shikii | G02B 6/0028 349/65 |
| 2012/0002137 | A1* | 1/2012 | Saito | G02F 1/133615 349/64 |
| 2012/0281025 | A1* | 11/2012 | Hanamoto | G09G 3/3413 345/690 |
| 2015/0331168 | A1* | 11/2015 | Wang | G09G 3/3406 362/606 |
| 2016/0124201 | A1* | 5/2016 | Kikuchi | G02B 21/16 359/385 |

* cited by examiner

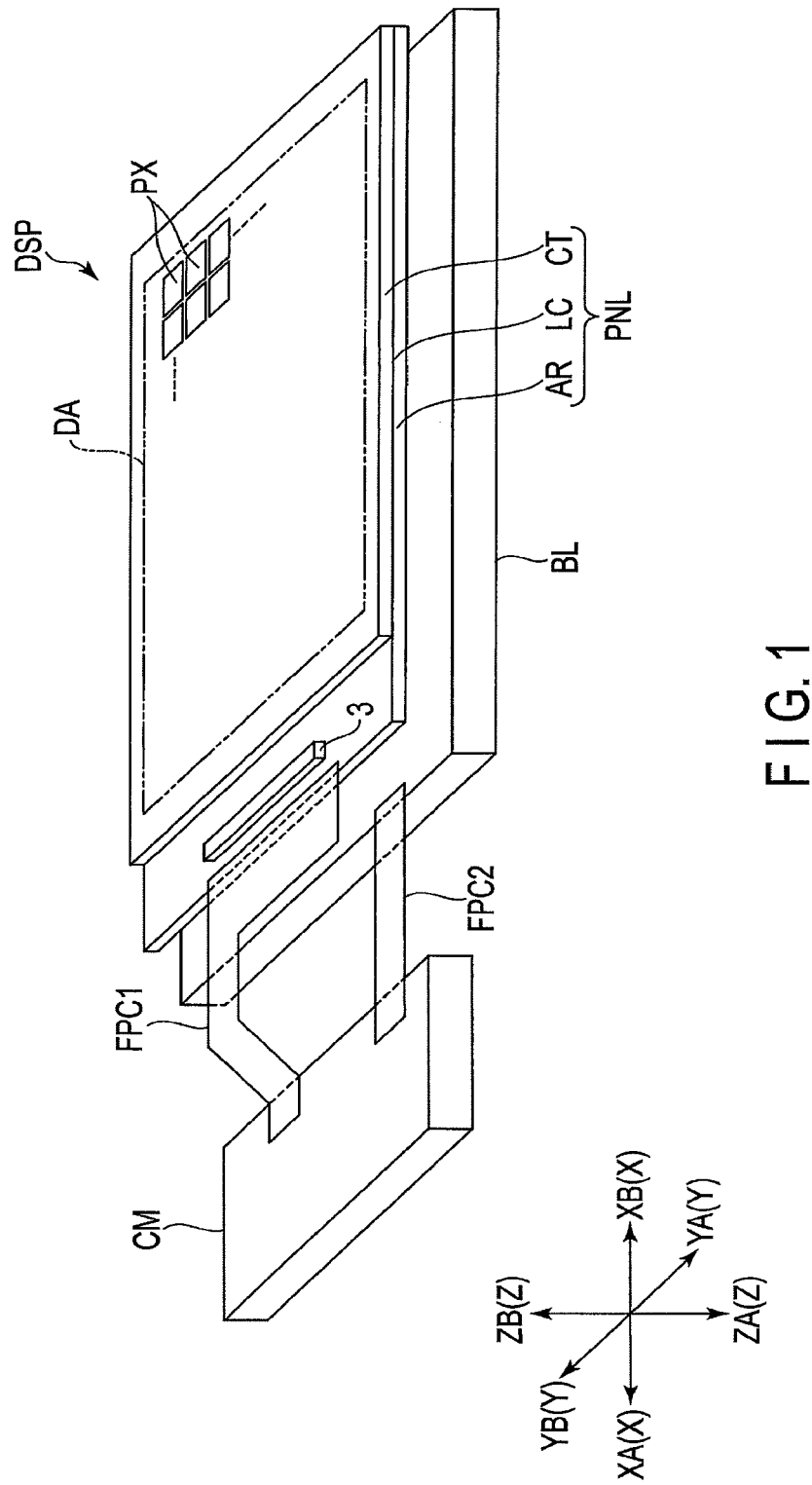
F I G. 1

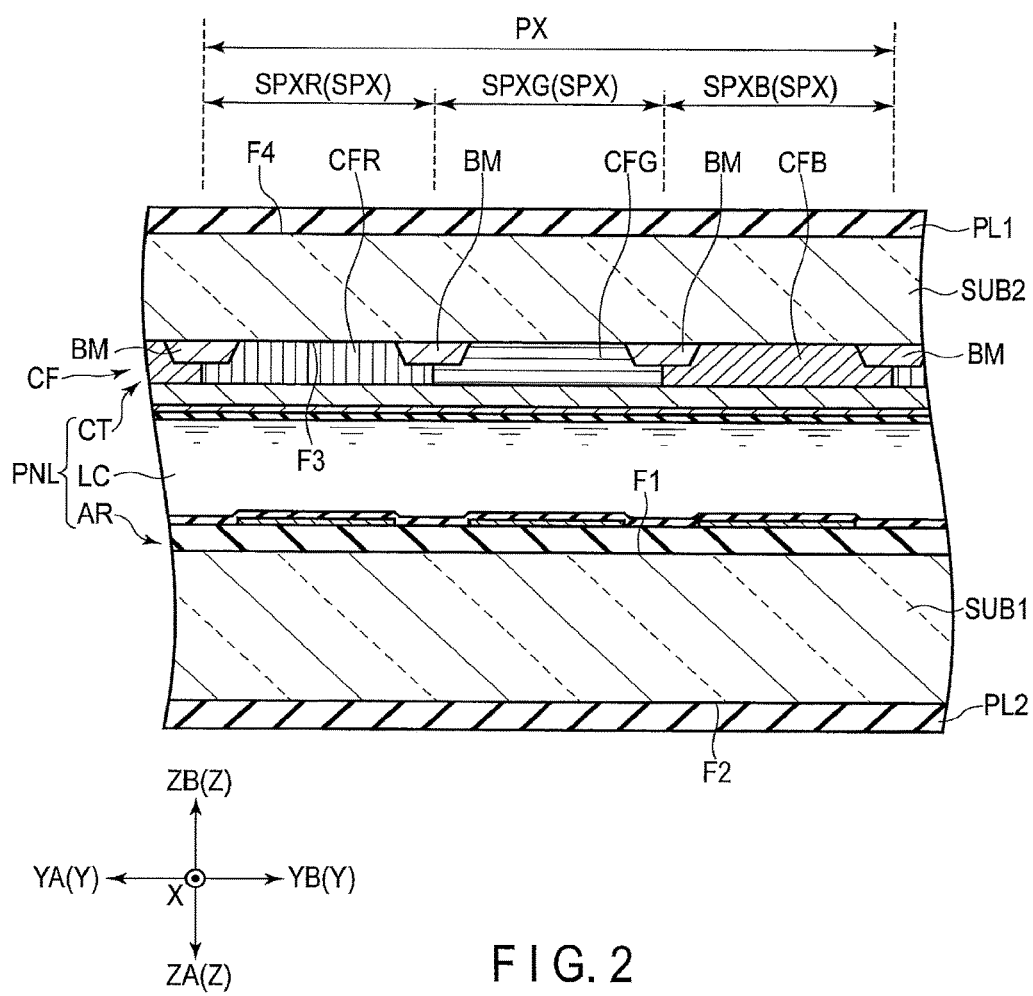
F I G. 2

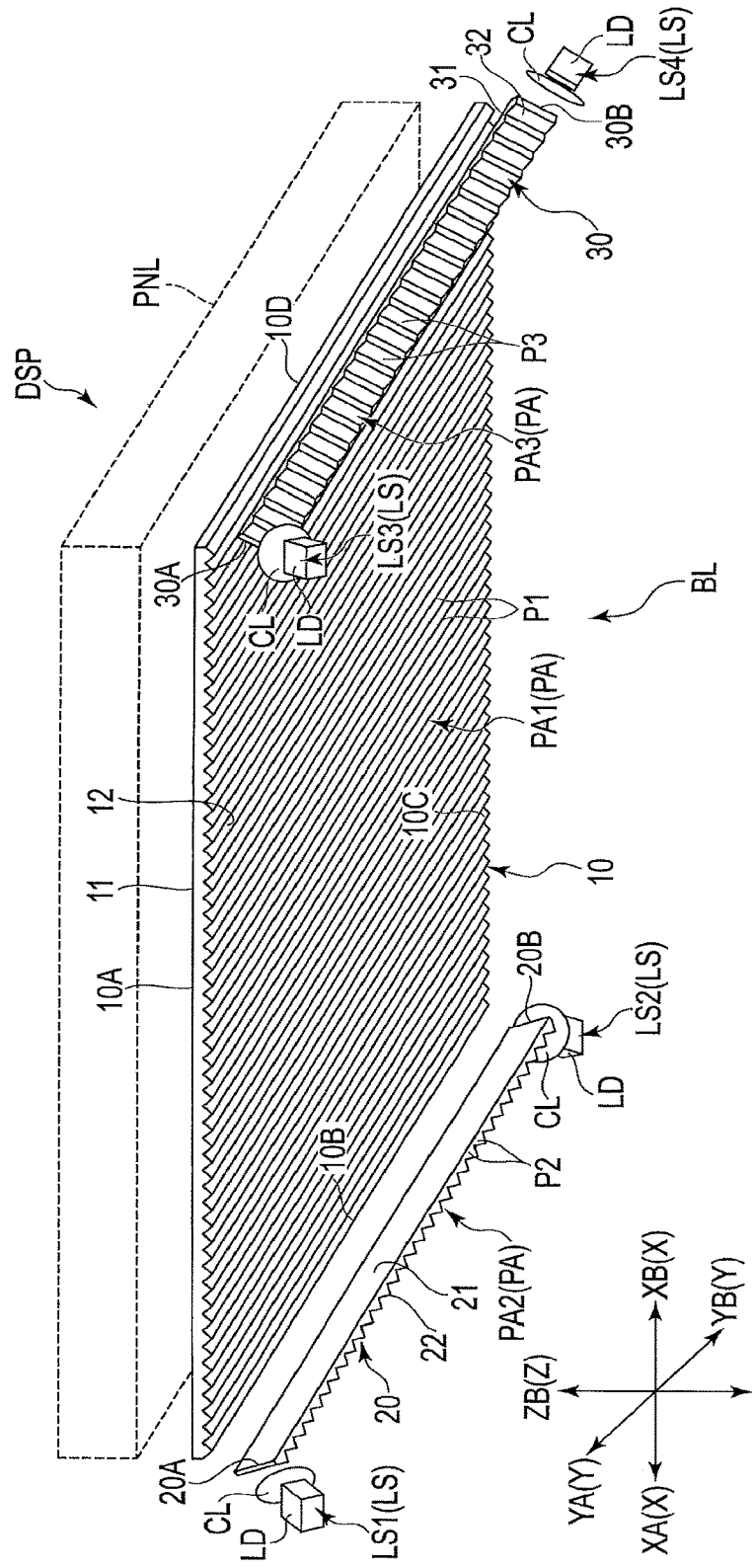
F I G. 3

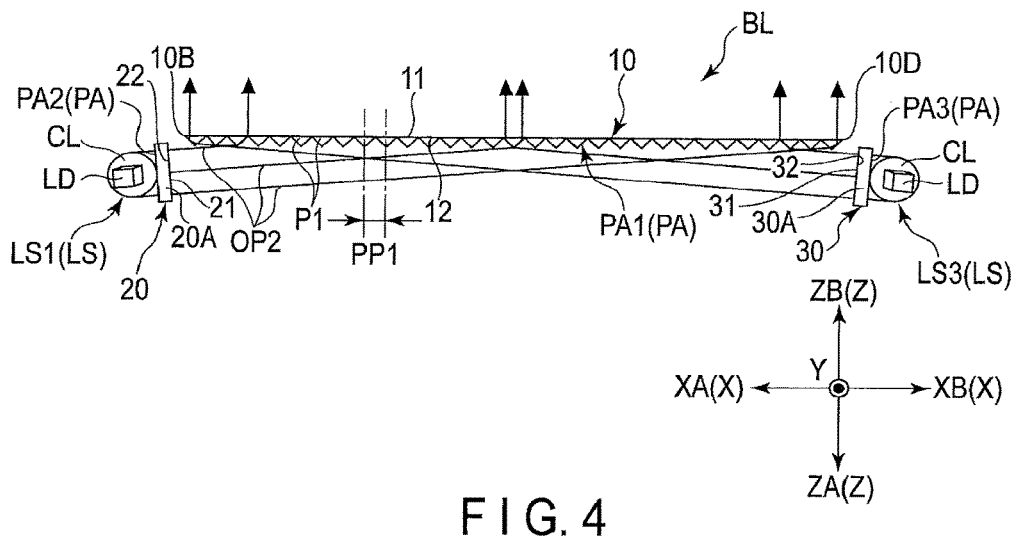
F I G. 4
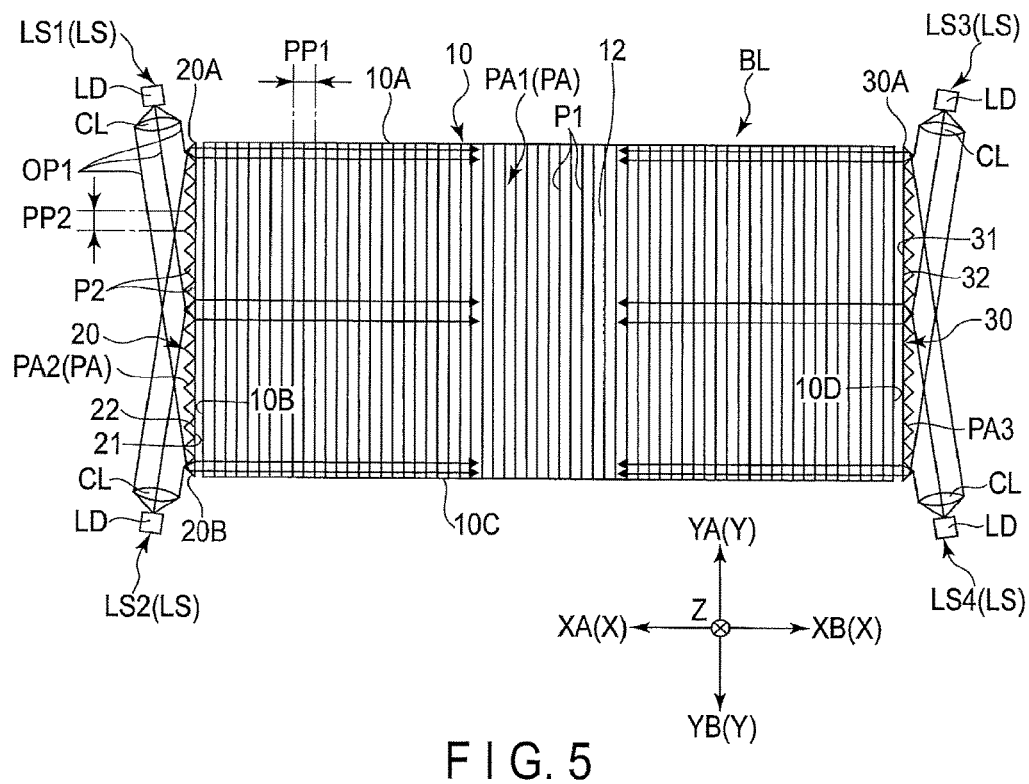
F I G. 5

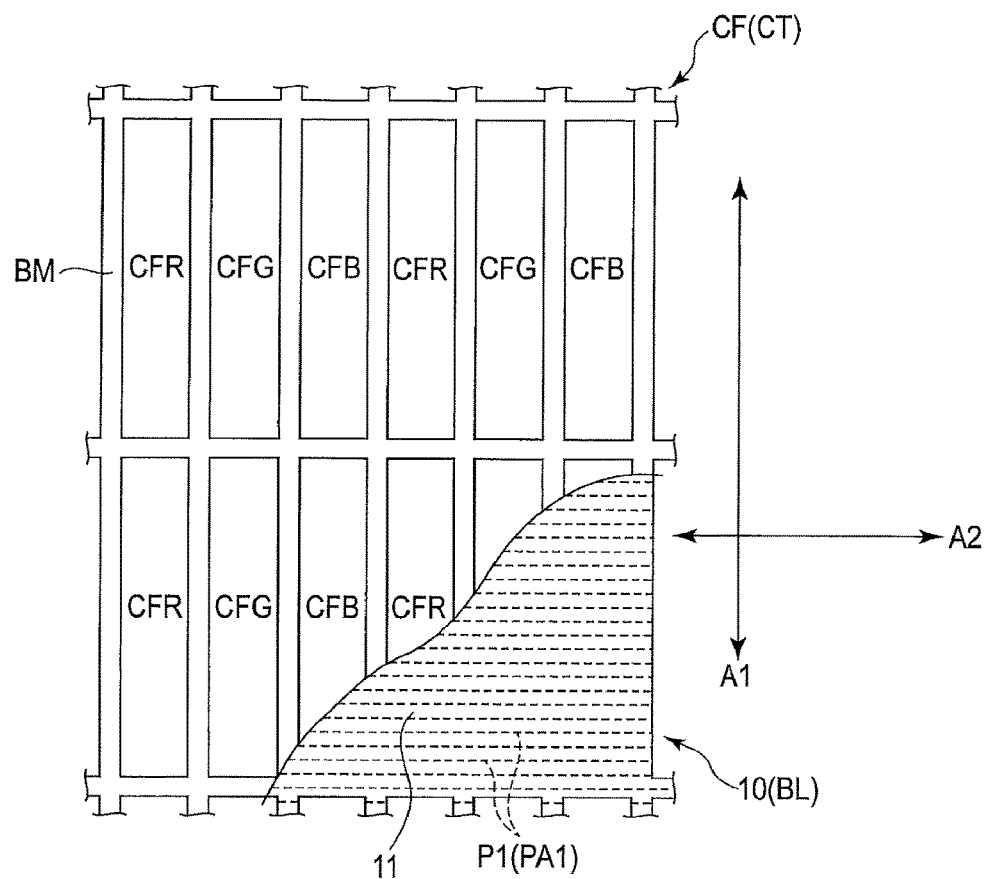
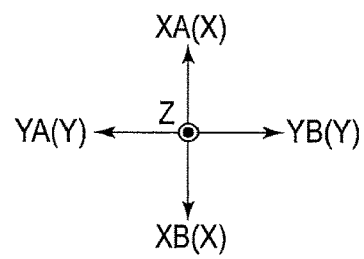
F I G. 6

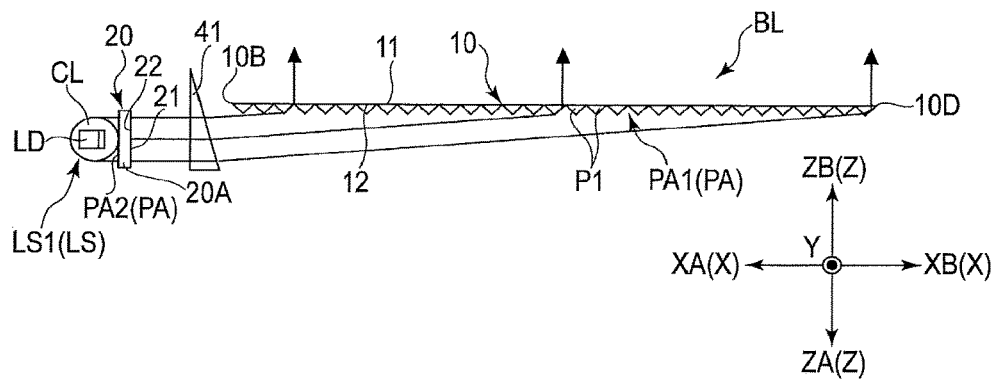
F I G. 7
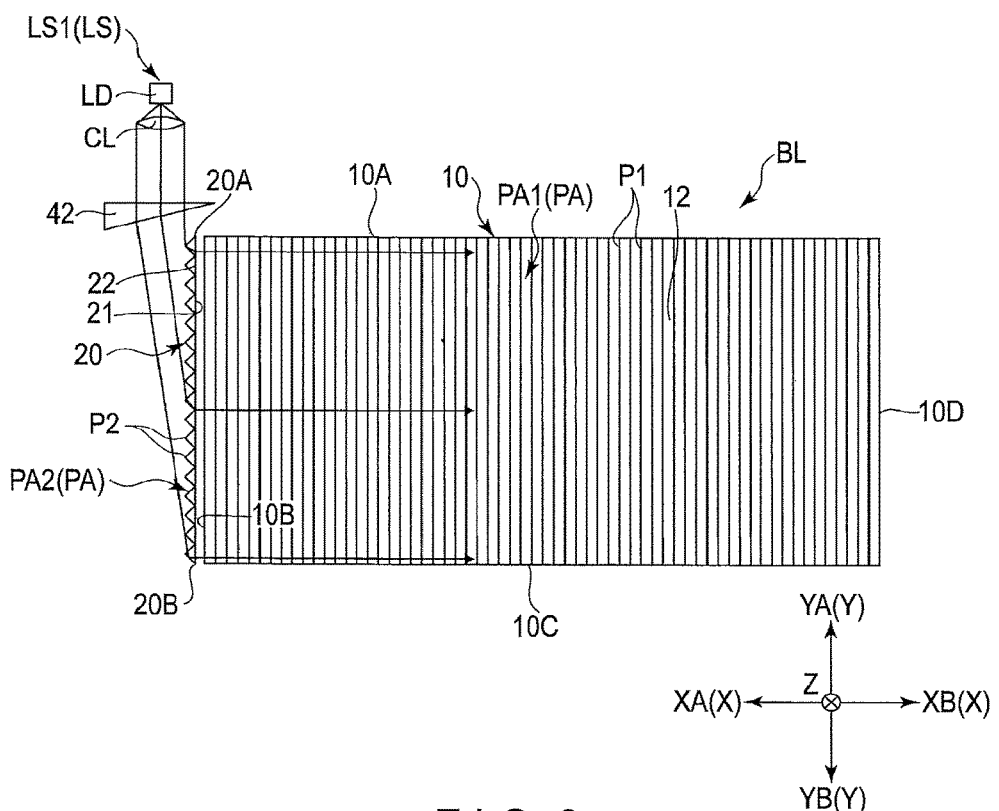
F I G. 8

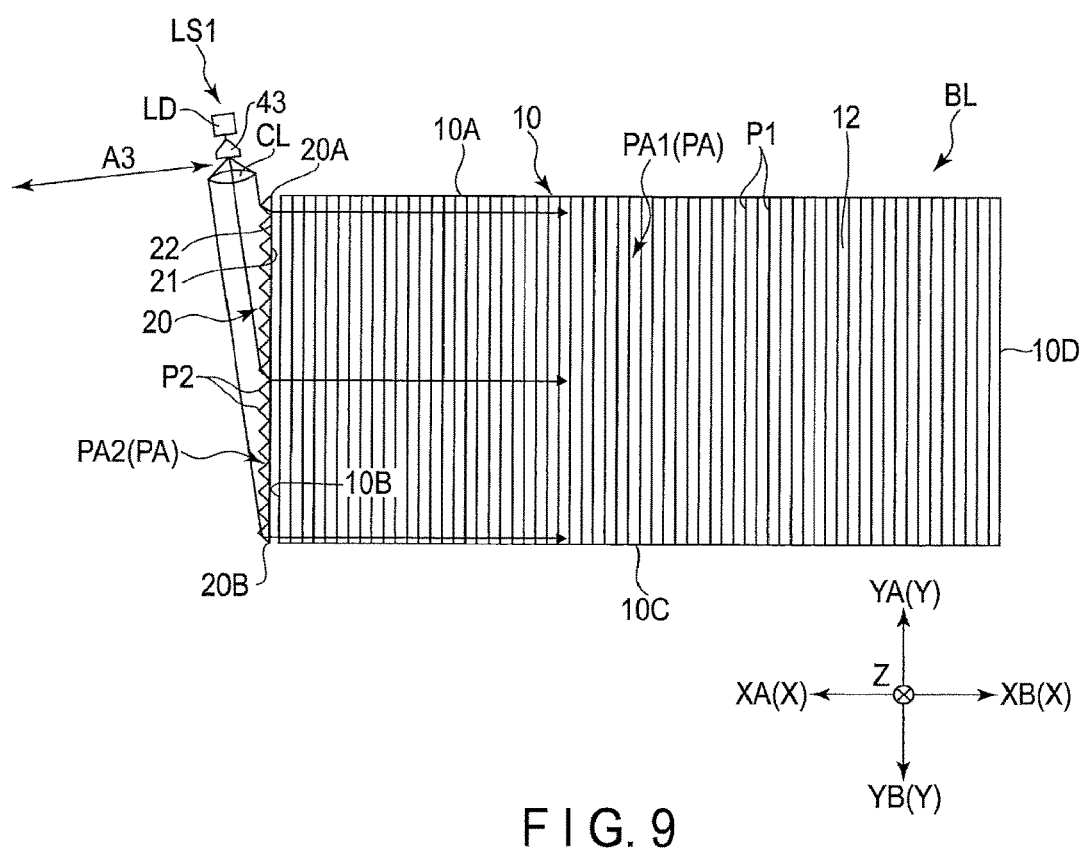
F I G. 9

ILLUMINATION DEVICE AND DISPLAY DEVICE

CROSS-REFERENCE TO RELATED APPLICATIONS

This application is based upon and claims the benefit of priority from Japanese Patent Application No. 2016-201792, filed Oct. 13, 2016, the entire contents of which are incorporated herein by reference.

FIELD

Embodiments described herein relate generally to an illumination device and a display device comprising the illumination device.

BACKGROUND

An illumination device comprising a light source which emits a laser beam and a light guide which guides the laser beam from the light source to a display panel has been well known as a backlight of a display device such as a liquid crystal display device. To obtain, for example, a white light beam in the illumination device using a laser beam, laser devices emitting red, green, and blue light beams need to be prepared and the laser beams of the primary colors need to be mixed.

If the white laser beam is applied to the light guide, an optical system including optical axes of laser beams of different colors is required. Since space for this optical system is required, downsizing the illumination device is difficult.

In contrast, if laser light beams of primary colors are directly applied to respective light guides, making the brightness on the emission surfaces of the light guides uniform is difficult due to a narrow angle of divergence and the like. In addition, if the laser beams of different colors are repeatedly reflected inside the light guide and mixed, the light use efficiency is reduced since the light beams are absorbed inside the light guide. Furthermore, the laser beam has a high degree of polarization, but the degree of polarization is lowered when the light beam passes inside the light guide even if the light guide is formed of a material having small birefringence.

BRIEF DESCRIPTION OF THE DRAWINGS

FIG. 1 is a perspective view showing a schematic structure of a liquid crystal display device as an example of a display device.

FIG. 2 is a cross-sectional view showing a schematic structure of the display panel shown in FIG. 1.

FIG. 3 is a perspective view showing a schematic structure of an illumination device according to the embodiment.

FIG. 4 is a side view showing a right side of the illumination device shown in FIG. 3.

FIG. 5 is a bottom view showing the illumination device shown in FIG. 3.

FIG. 6 is a partially cutaway plan view showing a color filter shown in FIG. 2.

FIG. 7 is a side view showing a right side of the illumination device according to a first modified example of the embodiment.

FIG. 8 is a side view showing a right side of the illumination device according to a second modified example of the embodiment.

FIG. 9 is a bottom view showing the illumination device according to a third modified example of the embodiment.

DETAILED DESCRIPTION

In general, according to one embodiment, an illumination device includes a first member, a second member, a first light source. The first member includes a first prism array including first prisms aligned in a first direction. The second member includes a second prism array including second prisms aligned in a second direction intersecting the first direction. The second member disposed more closely to a first A side of the first direction than to the first member. The first light source disposed more closely to a second A side of the second direction than to the second member to apply a parallel light beam to a second B side opposite to the second A side. The parallel light beam from the first light source is made incident on the second prism array and incident on the first prism array without passing through a light guide.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

In each of the embodiments, a liquid crystal display device DSP is disclosed as an example of the display device. The liquid crystal display device DSP can be used on, for example, various devices such as a smartphone, a tablet terminal, a mobile telephone terminal, a personal computer, a TV receiver, a vehicle-mounted device, a game console and a wearable terminal.

First, a structure common to the embodiments will be explained with reference to FIG. 1 and FIG. 2. FIG. 1 is a perspective view showing a schematic structure of the liquid crystal display device DSP. The liquid crystal display device DSP comprises a display panel PNL, an illumination device (backlight) BL which applies light to the display panel PNL, a control module CM which controls operations of the display panel PNL and the illumination device BL, a driver IC chip 3 which drives the display panel PNL, and flexible printed circuits FPC1 and FPC2 which transmit control signals of the control module CM to the display panel PNL and the illumination device BL.

In each of the embodiments, a first direction X, a second direction Y and a third direction Z are defined as shown in FIG. 1. Furthermore, one side of the first direction X is referred to as a first A side (rear side) XA, the other side of the first direction X is referred to as a first B side (front side) XB, one side of the second direction Y is referred to as a second A side (right side) YA, the other side of the second direction Y is referred to as second B side (left side) YB, one side of the third direction Z is referred to as a third A side (lower side) ZA, and the other side of the third direction Z is referred to as a third B side (upper side) ZB. The first direction X corresponds to a direction in which first prisms P1 to be explained later are arranged. The second direction Y corresponds to a direction in which second prisms P2 to be explained later are arranged.

The first direction X is also a direction of, for example, a longer side of the display panel PNL. The second direction Y is also a direction of, for example, a shorter side of the display panel PNL. The third direction Z is a direction intersecting the first direction X and the second direction Y. In the example illustrated in FIG. 1, the first to third directions X, Y, and Z are perpendicular to each other. The first to third directions X, Y, and Z may cross at the other angle.

The display panel (liquid crystal cell) PNL comprises an array substrate AR, a counter-substrate CT opposed to the array substrate AR, and a liquid crystal layer LC disposed between the array substrate AR and the counter-substrate CT. The liquid crystal layer LC is an example of an optical element which urges light to be transmitted therethrough. The display panel PNL includes a display area DA on which an image is displayed. The display panel PNL also includes a plurality of pixels PX arrayed in a matrix in the first direction X and the second direction Y, in the display area DA.

The control module CM sequentially receives image data for each frame to be displayed on the display area DA from a main board and the like of the electronic device on which the liquid crystal display device DSP is mounted. The image data includes, for example, information such as a display color of each of the pixels PX. The control module CM supplies a signal to drive each of the pixels PX, based on the received image data, to the display panel PNL. The control module CM also supplies a signal to drive light sources LS which will be explained later, based on the received image data, to the illumination device BL.

The driver IC chip 3 is mounted on, for example, the array substrate AR. The driver IC chip 3 may be mounted on the control module CM or the like. The flexible printed circuit FPC1 makes connection between the array substrate AR and the control module CM. The flexible printed circuit FPC2 makes connection between the illumination device BL and the control module CM.

The illumination device BL is disposed to be opposed to the array substrate AR of the display panel PNL and applies light to the display panel PNL from the back side. The illumination device BL will be explained later in detail.

FIG. 2 is a cross-sectional view showing a schematic structure of the display panel PNL. The array substrate AR and the counter-substrate CT of the display panel PNL comprise transparent first substrate SUB1 and second substrate SUB2, respectively. Each of the first substrate SUB1 and the second substrate SUB2 is formed of, for example, a glass substrate. Each of the first substrate SUB1 and the second substrate SUB2 may be formed of a transparent resin material.

The first substrate SUB1 has a first face F1 and a second face F2 opposed to the first face F1. The second substrate SUB2 has a third face F3 and a fourth face F4 opposed to the third face F3. The first to fourth faces F1, F2, F3, and F4 are, for example, parallel to the XY plane.

The array substrate AR and the counter-substrate CT are stuck on each other such that the first face F1 and the third face F3 are opposed to each other. The liquid crystal layer LC is sealed between the array substrate AR and the counter-substrate CT.

Polarizers PL1 and PL2 are disposed on a display surface side and a back surface side of the display panel PNL, respectively. In the example illustrated in FIG. 2, the polarizer PL1 on the display surface side is stuck on the fourth face F4 of the second substrate SUB2. The polarizer PL2 on the back surface side is stuck on the second face F2 of the first substrate SUB1. If an illumination device BL to be explained later is configure to apply polarized light oscillating in a direction parallel to an absorption axis of the polarizer PL1 on the display surface side, the polarizer PL2 on the back surface side may not be disposed.

The counter-substrate CT comprises a light-shielding layer BM and a color filter CF in addition to the second substrate SUB2. The light-shielding layer BM is formed on the third face F3 of the second substrate 20. The pixels PX include, for example, three sub-pixels SPX (SPXR, SPXG, and SPXB) corresponding to a red color (R), a green color (G), and a blue color (B) and the light-shielding layer BM section the sub-pixels SPX.

The color filter CF is provided on the third face F3 of the second substrate SUB2 and covers the third face F3 and the light-shielding layer BM. The color filter CF can also be disposed on the fourth face F4 and the array substrate AR. The color filter CF includes a color layer CFR corresponding to the red color, a color layer CFG corresponding to the green color, and a color layer CFB corresponding to the blue color. The color layer CFR is disposed in the sub-pixel SPXR, the color layer CFG is disposed in the sub-pixel SPXG, and the color layer CFB is disposed in the sub-pixel SPXB.

The light emitted from the illumination device BL (shown in FIG. 1) passes through the array substrate AR, the liquid crystal layer LC, and the counter-substrate CT. The light becomes visible light of the color corresponding to the color filter CF and reaches the polarizer PL2.

FIG. 3 is a perspective view showing a schematic structure of the illumination device BL according to the embodiment. As shown in FIG. 3, the illumination device BL comprises a first member (first prism sheet) 10, a second member (second prism sheet) 20, a third member (third prism sheet) 30, and first to fourth light sources LS1, LS2, LS3, and LS4 but does not comprise a light guide.

One of features of the present embodiment is to uniformly mix parallel light beams of a plurality of colors by the prism sheets (first to third members 10, 20, and 30) though the structure of the illumination device BL does not comprise a light guide, which will be explained later in detail.

The third member 30 has approximately the same shape and function as those of the second member 20. For this reason, the second member 20 will be explained in detail and duplicate explanations on the third member 30 will be omitted. Similarly to this, the second to fourth light sources LS2, LS3, and LS4 have approximately the same shape and function as those of the first light source LS1. For this reason, the first light source LS1 will be explained in detail and duplicate explanations on the second to fourth light sources LS2, LS3, and LS4 will be omitted.

As shown in FIG. 3, the first member 10 comprises a first main surface (emission surface) 11 disposed on the back surface side of the display panel PNL and opposed to the array substrate AR (shown in FIG. 1), and a second main surface (incidence surface) 12 on the side opposite to the first main surface 11. The first main surface 11 and the second main surface 12 are, for example, parallel to the XY plane.

An example of the first member 10 is a prism sheet. The first member 10 is formed of a resin material superior in transparency and a first prism array PA1 comprising a plurality of first prisms P1 is provided on the second main surface 12. In the first prism array PA1, the first prisms P1 extend in the second direction Y and are aligned in the first direction X.

The first member 10 is formed in, for example, a rectangular shape and has first to fourth sides 10A, 10B, 10C, and 10D.

The first side 10A and the third side 10C extend in the first direction X and serve as, for example, longer sides of the first member 10. The first side 10A is located on the second A side YA of the second direction Y, and the third side 10C is located on the second B side YB of the second direction Y.

The second side 10B and the fourth side 10D extend in the second direction Y and serve as, for example, shorter sides of the first member 10. The second side 102 is located on the first A side XA of the first direction X, and the fourth side 10D is located on the first B side XB of the first direction X.

As shown in FIG. 3, the second member 20 is disposed along the second side 10B of the first member 10 and is shaped in an elongated rectangle (strip) extending in the second direction Y. A length from an end (right end) 20A to the other end (left end) 20B of the second member 20 is set to be approximately the same as a length of the second side 10B of the first member 10.

The second member 20 comprises a third main surface (emission surface) 21 opposed to the first prism array PA1 of the first member 10, and a fourth main surface (incidence surface) 22 on the side opposite to the third main surface 21.

An example of the second member 20 is a prism sheet, similarly to the first member 10. A second prism array PA2 comprising a plurality of second prisms P2 is provided on the fourth main surface 22. In the second prism array PA2, the second prisms P2 are aligned in the second direction Y.

As shown in FIG. 3, the third member 30 is, for example, a prism sheet similar to the second member 20, and the third member 30 and the second member 20 are disposed symmetrically with respect to the first member 10. In other words, the third member 30 is disposed along the fourth side 10D of the first member 10 and is shaped in an elongated rectangle (strip) extending in the second direction Y. A length from an end (right end) 30A to the other end (left end) 30B of the third member 30 is set to be approximately the same as a length of the fourth side 10D of the first member 10.

The third member 30 comprises a fifth main surface (emission surface) 31 opposed to the first prism array PA1 of the first member 10, and a sixth main surface (incidence surface) 32 on the side opposite to the third main surface 31. A third prism array PA3 comprising a plurality of third prisms P3 is provided on the sixth main surface 32. In the third prism array PA3, the third prisms P3 are aligned in the second direction Y.

Incidentally, a pitch PP1 (shown in FIG. 4) of the first prisms P1 is uniformly described over the first prism array PA1. On an actual product, however, non-uniformity in luminance resulting from light diffraction easily occurs on the first main surface 11 of the first member 10 if a pitch PP2 (shown in FIG. 5) of the second prisms P2 is uniform over the second prism array PA2.

For this reason, the pitch PP1 of the first prisms P1 is desirably varied on at least a part of the first prism array PA1. Alternately, the pitch PP2 of the second prisms P2 is desirably varied on at least a part of the second prism array PA2. The pitch of the third prisms P3 is set similarly.

In addition, if the pitch PP1 of the first prisms P1 is the same as the pitch PP2 of the second prisms P2, non-uniformity in luminance resulting from light diffraction easily occurs on the first main surface of the first member 10. For this reason, the pitch PP2 of the second prisms P2 should be different from the pitch PP1 of the first prisms P1. For example, the pitch PP2 is desirably formed to be narrower than the pitch PP1. The pitch PP2 may be formed to be wider than the pitch PP1.

In addition, in the embodiment, parallel light beams obliquely incident on the incidence surfaces (second main surface 12, fourth main surface 22 and sixth main surface 32) need to be greatly refracted and guided to the emission surfaces (first main surface 11, third main surface 21 and fifth main surface 31), which will be explained later in detail.

To enable the light to be greatly refracted, the prism arrays PA (first to third prism arrays PA1, PA2, and PA3) are desirably provided on the incidence surface side. Alternately, the prism arrays PA can also be provided on the emission surface side.

As shown in FIG. 3, the first light source LS1 and the second light source LS2 are disposed near an end 20A and the other end 20B of the second member 20, respectively. The third light source LS3 and the fourth light source LS4 are disposed near an end 30A and the other end 40B of the third member 30, respectively. The first light source LS1 and the third light source LS3 apply parallel light beams to the second B side YB of the second direction Y. The second light source LS2 and the fourth light source LS4 apply parallel light beams to the second A side YA of the second direction Y.

FIG. 4 is a side view showing a right side of the illumination device BL. FIG. 5 is a bottom view showing a bottom of the illumination device BL.

As shown in FIG. 4, the second member 20 is located more closely to the first A side XA than to the second side 10B of the first member 10 in the first direction (longitudinal direction) X and located more closely to the third A side ZA than to the second main surface 12 of the first member 10 in the third direction (vertical direction) Z. The third main surface 21 of the second member 20 is oriented to the first B side XB of the first direction X and is slightly inclined to apply light to the third B side ZB of the third direction Z.

As shown in FIG. 4, the third member 30 and the second member 20 are disposed symmetrically with respect to the first member 10. In other words, the third member 30 is located more closely to the first B side XB than to the fourth side 10D of the first member 10 in the first direction X and located more closely to the third A side ZA than to the second main surface 12 of the first member 10 in the third direction Z. The fifth main surface 31 of the third member 30 is oriented to the first A side XA of the first direction X and is slightly inclined to apply light to the third B side ZB of the third direction Z.

Next, arrangement of the light sources LS will be explained. As shown in FIG. 4 and FIG. 5, the first light source LS1 is located more closely to the first A side XA than to the fourth main surface 22 of the second member 20 in the first direction (longitudinal direction) X, located more closely to the second A side YA than to the end 20A of the second member 20 in the second direction Y, and located at approximately the same height as the second member 20 in the third direction Z.

As shown in FIG. 5, the second light source LS2 and the first light source LS1 are disposed to have line symmetry. In other words, the second light source LS2 is located more closely to the first A side XA than to the fourth main surface 22 of the second member 20 in the first direction X and located more closely to the second B side YB than to the other end 20B of the second member 20 in the second direction Y. The second light source LS2 is located at approximately the same height as the second member 20 in the third direction Z though not illustrated in the drawing.

As shown in FIG. 4 and FIG. 5, the third light source LS3 and the first light source LS1 are disposed symmetrically. The third light source LS3 is located more closely to the first B side XB than to the sixth main surface 32 of the third member 30 in the first direction X, located more closely to the second A side YA than to the other end 30B of the third member 30 in the second direction Y, and located at approximately the same height as the third member 30 in the third direction Z.

As shown in FIG. 5, the fourth light source LS4 and the third light source LS3 are disposed to have line symmetry. The fourth light source LS4 is located more closely to the first B side XB than to the sixth main surface 32 of the third member 30 in the first direction X and located more closely to the second B side YB than to the other end 30B of the third member 30 in the second direction Y. The fourth light source LS4 is located at approximately the same height as the third member 30 in the third direction though not illustrated in the drawing.

As shown in FIG. 5, each of the light sources LS (first to fourth light sources LS1, LS2, LS3, and LS4) comprises a laser device LD which emits light and a collimating lens CL disposed between the laser device LD and the second member 10. The light source LS generates parallel light with the collimating lens CL and the laser device LD which is a point source.

The parallel light is called collimated light, traveling substantially straight in space and having a high orientation. In the present specification, the parallel light is not limited to light in which light beams are strictly parallel, but includes slightly wide and substantially parallel light.

As shown in FIG. 5, the first light source LS1 is located near the end 20A of the second member 20 and applies the parallel light beam to the second prism array PA2 located between the ends 20A and 20B of the second member 20. An optical path of the parallel light beam applied from the first light source LS1 to the second member 20 is denoted by OP1 in FIG. 5. The parallel light beam from the first light source LS1 is made obliquely incident on the fourth main surface 22, vertically refracted to the third main surface 21 by the second prism array PA2, and emitted from the third main surface 21. In other words, the parallel light beam incident on the second member 20 which is a prism sheet is emitted from the second member 20 by one reflection.

In contrast, the second light source LS2 is located near the other end 20B of the second member 20 and applies the parallel light beam to the second prism array PA2 from the side opposite to the first light source LS1 in the second direction Y. The parallel light beam applied from the first light source LS1 and the parallel light beam applied from the second light source LS2 are overlapped and uniformly mixed at the second prism array PA2. The parallel light beam emitted from the third main surface 21 of the second member 20 has a color obtained by mixing the colors of the parallel light beams of the first light source LS1 and the second light source LS2.

Similarly, the third light source LS3 and the fourth light source LS4 are located near the end 30A and the other end 30B of the third member 30 and apply parallel light beams to the third prism array PA3 located between the ends 30A and 30B of the third member 30.

The parallel light beams applied from the third light source LS3 and the fourth light source LS4 simultaneously to the same third prism array PA3 are overlapped and uniformly mixed at the third prism array PA3. The parallel light beam emitted from the fifth main surface 31 of the third member 30 has a color obtained by mixing the colors of the parallel light beams of the third light source LS3 and the fourth light source LS4.

Optical paths of the parallel light beam applied from the second member 20 to the first member 10 are denoted by OP2 in FIG. 4. The parallel light beam obtained by mixing the parallel light beams from the first light source LS1 and the second light source LS2 is emitted from the third main surface 21 of the second member 20 and made incident on the first prism array PA1 of the first member 10 without passing through the light guide. At this time, since the second member 20 is located more closely to the first A side XA than to the second side 10B of the first member 10 and the first prism array PA1 is located between the second side 10B and the fourth side 10D of the first member 10, the parallel light beam from the second member 20 is made obliquely incident on the first prism array PA1 located on the second main surface 12 of the first member 10.

The parallel light beam obliquely incident on the second main surface 12 is refracted vertically to the first main surface 11 by the first prism array PA1 and applied to the display panel PNL. In other words, the parallel light beam incident on the first member 10 which is a prism sheet is emitted from the first member 10 by one reflection.

Similarly, the parallel light beam obtained by mixing the parallel light beams from the third light source LS3 and the fourth light source LS4 is emitted from the fifth main surface 31 of the third member 30 and made obliquely incident on the first prism array PA1 located on the second main surface 12 of the first member 10 without passing through the light guide. The obliquely incident parallel light beam is refracted vertically to the first main surface 11 by the first prism array PA1 and applied to the display panel PNL.

The parallel light beam emitted from the second member 20 and the parallel light beam emitted from the third member 30 are overlapped and uniformly mixed at the first prism array PA1 of the first member 10. For example, if the colors of the parallel light beams applied from the first to third light sources LS1, LS2, and LS3 are primary colors, the light beams mixed at the first member 10 become white light.

The fourth light source LS4 applies a light beam of any one of red (R), green (G), and blue (B). If the light beam applied to the back surface of the display panel PNL by the illumination device BL is not white light, several light sources of the second to fourth light sources LS2, LS3, and LS4 may not be disposed. If the light beam is white light, the fourth light source LS4 may not be disposed.

The laser device LD emitting a green (G) light beam has a low light emission efficiency as compared with the laser device LD emitting a red (R) or blue (B) light beam. For this reason, if four light sources LS (first to fourth light sources LS1, LS2, LS3, and LS4) are disposed, the fourth light source LS4 desirably applies a green (G) parallel light beam.

If the third light source LS3 applies a green (G) parallel light beam and the fourth light source LS4 also applies a green (G) parallel light beam, only green (G) parallel light beams are applied to the third member 30. In this case, the third member 30 can be designed optimally in accordance with a wavelength of the green (G) light beam.

In contrast, if the first light source LS1 applies a green (G) parallel light beam and the fourth light source LS4 also applies a green (G) parallel light beam, the color can be mixed more uniformly since green parallel light beams are applied from the first light source LS1 and the fourth light source LS4 located diagonally to the first member 10. The second light source LS2 may be configured to apply a green (G) parallel light beam.

In the structure in which two light sources LS apply green (G) parallel light beams, the fourth light source LS4 and any one of the first to third light sources LS1, LS2, and LS3 may apply the parallel light beams of green (G) and (G) having the same dominant wavelengths or may apply parallel light beams of green (G1) and (G2) having different dominant wavelengths. If the parallel light beams of green (G1) and (G2) have different dominant wavelengths, hue of the green color can be extended.

FIG. 6 is a partially cutaway plan view showing the color filter CF. Each of the above-explained color layers CFR, CFG, and CFB is formed in a stripe shape extending in the first direction X. In FIG. 6, the direction of extension of the color layers CFR, CFG, and CFB is denoted by A1 and the direction of extension of the first prisms P1 is denoted by A2. The direction A2 of extension of the first prisms P1 is a direction intersecting the first direction X which is the direction of alignment of the first prisms P1 and corresponds to the second direction Y.

If the directions A1 and A2 correspond to each other, non-uniformity in luminance easily occurs in the light passing through the color filter CF due to diffraction. As shown in the example in FIG. 6, the direction A1 of extension of the color layers CFR, CFG, and CFB desirably intersect the direction A2 of extension of the first prisms P1.

Next, the illumination device BL according to modified examples of the embodiment will be explained. Constituent elements which are similar to or the same as those of the embodiment are denoted by similar reference numerals with reference to the corresponding descriptions of the first embodiment, and their detailed explanations are omitted. In addition, constituent elements other than those explained below are the same as the first embodiment.

First Modified Example

The illumination device BL according to a first modified example of the embodiment will be explained with reference to FIG. 7. FIG. 7 is a side view showing a right side of the illumination device BL according to the first modified example. The illumination device BL according to the first modified example shown in FIG. 7 is different from the illumination device BL shown in FIG. 4 with respect to a feature of comprising a refracting lens (first refracting lens) 41 disposed between the second member 20 and the first member 10.

The refracting lens 41 is disposed in an optical path of the parallel light beam emitted from the second member 20 to refract the parallel light beam to the first member 10. In the example illustrated in FIG. 7, a parallel light beam is applied from the second member 20 to the refracting lens 41 in the first direction X. The refracting lens 41 slightly refracts the traveling direction to the third B side ZB (upwardly) to urge the parallel light beam to be made incident on the first member 10.

The traveling direction of the parallel light beam emitted from the second member 20 is not limited to the example shown in FIG. 7 but may be oriented in the other direction. For example, the parallel light beam emitted from the second member 20 is inclined to the third A side ZA or the third B side ZB with respect to the first direction X and the refracting lens 41 may refract the parallel light beam to the first member 10.

The refracting lens 41 can be disposed not only between the second member 20 and the first member 10, but also between the third member 30 and the first member 10.

According to the illumination device BL of the first modified example, the degree of freedom in design can be improved in relation to the arrangement of the second member 20 and the first member 10 since the parallel light beam from the second member 20 can be freely refracted by the refracting lens 41.

Second Modified Example

A second modified example of the embodiment will be explained with reference to FIG. 8. FIG. 8 is a bottom view showing a bottom of the illumination device BL according to the second modified example. The illumination device BL according to the second modified example shown in FIG. 8 is different from the illumination device BL shown in FIG. 5 with respect to a feature of comprising a refracting lens (second refracting lens) 42 disposed between the light source LS and the second member 20.

The refracting lens 42 is disposed in an optical path of the parallel light beam emitted from the first light source LS1 (light source LS) to refract the parallel light beam to the second member 20. In the example illustrated in FIG. 8, a parallel light beam is applied from the light source LS in the second direction Y. The refracting lens 42 slightly refracts the traveling direction of the parallel light beam to the first B side ZB to urge the parallel light beam to be made incident on the second member 20.

The traveling direction of the parallel light beam emitted from the first light source LS1 is not limited to the example shown in FIG. 8 but may be oriented in the other direction. For example, the parallel light beam emitted from the first light source LS1 (light source LS) is inclined to the first A side XA or the third B side XB with respect to the second direction Y and the refracting lens 42 may refract the parallel light beam to the second member 20.

The refracting lens 42 can be disposed not only between the first light source LS1 and the second member 20, but also between the second light source LS2 and the second member 20, between the third light source LS3 and the third member 30, and between the fourth light source LS4 and the third member 30.

According to the illumination device BL of the second modified example, the degree of freedom in design can be improved in relation to the arrangement of the light source LS and the second member 20 (third member 30) since the parallel light beam from the light source LS can be freely refracted by the refracting lens 42.

Third Modified Example

A third modified example of the embodiment will be explained with reference to FIG. 9. FIG. 9 is a bottom view showing a bottom of the illumination device BL according to the third modified example. The illumination device BL according to the first modified example shown in FIG. 9 is different from the illumination device BL shown in FIG. 5 with respect to a feature of comprising a Powell lens (line generator) 43 disposed between the laser device LD and the collimating lens CL.

The Powell lens 43 has, for example, an incidence surface formed in a round roof shape, and converts spotlight from the laser device LD into a linear light beam having a uniform intensity by increasing the intensity at both end parts of the emitted light beam while reducing the intensity at a central part of the emitted light. The Powell lens 43 shown in FIG. 9 controls the light intensity in a direction (A3 in FIG. 9) which is perpendicular to the optical axis and parallel to the XY plane. The light beam emitted from the Powell lens 43 is made incident on the collimating lens CL.

If the parallel light beam incident on the second member 20 has a uniform intensity in the direction A3, the parallel light beam is converted into a parallel light beam having a uniform intensity in the second direction Y when refracted to a parallel light beam which is parallel in the first direction X by the second prism array PA2 of the second member 20.

The Powell lens 43 can be provided not only at the first light source LS1, but also at the second to fourth light sources LS2, LS3, and LS4.

According to the third modified example, non-uniformity in luminance in the second direction Y can be reduced on the first main surface 11 of the illumination device BL.

In the illumination device BL according to the embodiments and the modified examples as constituted as explained above, a light guide is not disposed between the first member 10 and the second member 20. If the light beam propagates while repeating reflection inside the light guide, the light beam is absorbed into the light guide and the light use efficiency is reduced. In addition, even inside a light guide having a low birefringence property, maintaining the degree of light polarization is difficult if the light beam is repeatedly reflected and the optical path length becomes large.

According to the embodiments, the parallel light beam emitted from each of the light sources LS1, LS2, LS3, and LS4 is made incident on the display panel PNL at the least number of times by the first to third prism sheets 10, 20, and 30. Since the light beam is not absorbed into the light guide, the use efficiency of light can be improved.

Furthermore, the light beam can also be made incident on the display panel while maintaining a high degree of polarization. Thus, even if, for example, two polarizers are disposed on the display panel, 80% or more of light can be used for display by the drive of the liquid crystal layer LC. In addition, for example, one of two polarizers may not be disposed. If two polarizers are disposed, optical loss occurs every time the light beam passes through the polarizers. If two polarizers are reduced to one, optical loss resulting from the polarizers can be reduced and the power consumption can be saved. The liquid crystal display device DSP can also be thinned as the number of the polarizers is reduced.

In addition to the above, various preferable advantages can be obtained from the present embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a diffusing film may be disposed between the back surface of the display panel PNL and the first member 10 to suppress the non-uniformity in luminance and compensate for the viewing angle. The laser semiconductor emitting a laser light beam is not limited but, for example, a light-emitting diode emitting polarized light may be used, as the point source. The pixels PX may further include, for example, sub-pixels SPX corresponding to white and the like or may include sub-pixels SPX corresponding to the same color.

What is claimed is:

1. An illumination device, comprising:
a first member comprising a first prism array including first prisms aligned in a first direction, the first member being formed in a rectangular shape having longer sides extending in the first direction and first and second shorter sides extending in a second direction intersecting the first direction, the first member having a first main surface extending in the first direction for emitting light and a second main surface as a light incidence surface opposite to the first main surface, and the second main surface including the first prisms for receiving light without passing through a light guide;
a second member comprising a second prism array including second prisms aligned in the second direction, the second member being disposed at the second main surface side of the first member and being along with the first shorter sides of the first member, and the second member having a third main surface for emitting light to the second main surface of the first member and a fourth main surface for receiving light;
a third member comprising a third prism array including third prisms aligned in the second direction, the third member being disposed at the second main surface side of the first member, and along the second shorter side of the first member, the third member having a fifth main surface for emitting light to the second main surface of the first member and a sixth main surface for receiving light;
a first light source disposed at a first end side of the second member and emitting a parallel light beam to the fourth main surface of the second member;
a second light source disposed at a second end side of the second member and emitting a parallel light beam to the fourth main surface of the second member;
a third light source disposed at a third end side of the third member and emitting a parallel light beam to the sixth main surface of the third member; and
a fourth light source disposed at a fourth end side of the third member and emitting a parallel light beam to the sixth main surface of the third member,
wherein the parallel light beam emitted from the fourth light source and the parallel light beam emitted from the first light source or the third light source are both green and have different dominant wavelengths.

2. The illumination device of claim 1, wherein the first light source comprises a laser device emitting a light beam and a collimating lens controlling the light beam emitted from the laser device as the parallel light beam emitted from the first light source, and the collimating lens is disposed between the laser device and the second member.

3. The illumination device of claim 2, further comprising:
a Powell lens disposed between the laser device and the collimating lens to control intensity of the light beam in the second direction.

4. A display device, comprising:
a display panel having a display surface and a back surface on a side opposite to the display surface, and comprising a color filter including color layers; and
the illumination device of claim 3, disposed on the back surface side of the display panel,
wherein the color layers extend in a direction intersecting a direction of extension of the first prisms.

5. A display device, comprising:
a display panel having a display surface and a back surface on a side opposite to the display surface, and comprising a color filter including color layers; and
the illumination device of claim 2, disposed on the back surface side of the display panel,
wherein the color layers extend in a direction intersecting a direction of extension of the first prisms.

6. The illumination device of claim 1, further comprising:
a refracting lens disposed between the first light source and the second member or between the second member and the first member to refract the parallel light beam emitted from the first light source.

7. A display device, comprising:
a display panel having a display surface and a back surface on a side opposite to the display surface, and comprising a color filter including color layers; and
the illumination device of claim 6, disposed on the back surface side of the display panel,
wherein the color layers extend in a direction intersecting a direction of extension of the first prisms.

8. A display device, comprising:
a display panel having a display surface and a back surface on a side opposite to the display surface, and comprising a color filter including color layers; and
the illumination device of claim 1, disposed on the back surface side of the display panel,
wherein the color layers extend in a direction intersecting a direction of extension of the first prisms.

* * * * *